United States Patent [19]

Lewicki, Jr.

[11] 4,089,731
[45] May 16, 1978

[54] APPARATUS FOR MULTILEVEL EMBOSSING OF SHEET MATERIALS

[75] Inventor: Walter J. Lewicki, Jr., Lancaster, Pa.

[73] Assignee: Armstrong Cork Company, Lancaster, Pa.

[21] Appl. No.: 765,225

[22] Filed: Feb. 3, 1977

Related U.S. Application Data

[62] Division of Ser. No. 574,860, May 6, 1975.

[51] Int. Cl.² .................. B31F 5/00; B32B 31/00; A01J 21/00
[52] U.S. Cl. .................. 156/555; 156/582; 425/363; 425/385
[58] Field of Search ............. 156/555, 582, 219, 220, 156/350; 425/385, 363

[56] References Cited

U.S. PATENT DOCUMENTS 3,176,058  3/1968  Mittman .................. 264/284
3,741,851  6/1973  Erb et al. ................. 156/209

Primary Examiner—Douglas J. Drummond

[57] ABSTRACT

The process herein is used for achieving multilevel mechanical embossing of a sheet material having a fused or cured wear layer. An embossed pattern is provided in register with a printed design under the wear layer. A two stage embossing is carried out. In the first stage embossing, a texturing is placed on the raised areas of the finished product. The second stage embossing provides deep embossing, which would be in register with the printed design under the wear layer.

1 Claim, 2 Drawing Figures

APPARATUS FOR MULTILEVEL EMBOSSING OF SHEET MATERIALS

CROSS-REFERENCE TO RELATED APPLICATION

This is a division of application Ser. No. 574,860, filed May 6, 1975.

BACKGROUND OF THE INVENTION

1. Field of the Invention

The invention is directed to a process for manufacturing floor covering material and, more particularly, to a process for the mechanical embossing of a pattern on a floor covering material.

2. Description of the Prior Art

U.S. Pat. No. 3,741,851 discloses a process for making a foam vinyl floor covering. A printed color pattern or design is provided between a foam resin layer and a transparent resin wear layer. Embossing is carried out relative to the transparent resin layer and the embossing is carried out in register with the printed pattern.

U.S. Pat. No. 3,176,058 is directed to an apparatus for embossing sheet material. Cooling means are provided to cool either one or both sides of the sheet material prior to embossing.

U.S. Pat. No. 3,305,419 is directed to an apparatus for embossing a foamed backed polyurethane sheet. Surface heating is carried out to heat only the surface to be embossed so that there will be no damage to the underlying foam layer.

Finally, U.S. Pat. No. 3,196,062 is directed to a process wherein cooled embossing rolls are utilized to provide an embossed pattern on a sheet material which is composed of a foamed thermoplastic resin base and a thermoplastic resin top coating. Surface heating of the thermoplastic resin is carried out just prior to embossing.

SUMMARY OF THE INVENTION

In the inventive process herein, the expansion of a decorated foam and the fusion of a wear layer thereover are completed in an earlier step in the same manufacturing process in which the embossing is carried out. In other words, the embossing operation is carried out at the end of the processing line which forms the expanded foam product with a fused or cured wear layer. The wear layer is maintained at its high surface temperature while the foam backing may or may not be cooled on its backside. Appropriate guide structures and controls feed the combination foam layer-wear layer structure into an embossing structure which will place an embossing pattern on the combination wear layer-foam layer structure in registry with a printed design on the surface of the foam layer. The embossing structure has a "bottomless" embossing roll configuration and, therefore, will cause deep embossing in selected areas in registry with the printed design, but will not contact those areas which end up as the raised areas of the finished product. In order for the raised areas of the finished product to have some embossed effect, an embossed texturing roll is incorporated in the guide apparatus to provide a texturing of the raised areas of the finished product. Consequently, two-stage embossing is carried out with the first stage embossing providing only texturing to the raised areas of the finished product, while the second stage embossing provides the deep embossing which forms the embossed configuration of the finished product in register with a printed design of the finished product.

This invention permits the manufacture of a laminar-flooring material with the incorporation of designs and/or textures having fine details onto the transparent wear layer, as well as more rounded and deeply embossed relief areas in register with predetermined portions of a decorative pattern under the wear layer.

DESCRIPTION OF THE PREFERRED EMBODIMENTS

The invention herein is an improvement over the process for the manufacturing of the product of U.S. Pat. No. 3,741,851 and U.S. Pat. No. 3,655,312.

Figure 1:
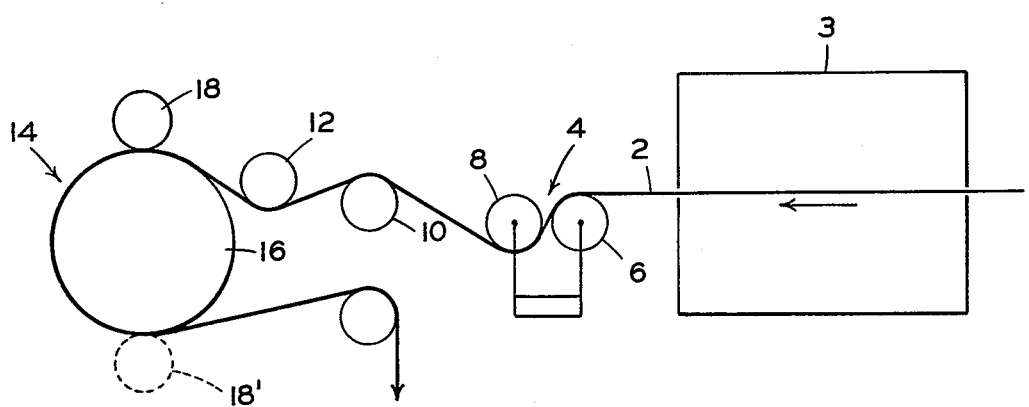
FIG. 1 of the drawing is a schematic showing of the process for carrying out the invention herein; and, FIG. 2 is a cross-sectional view of a floor covering product made by the process of the invention herein.
Figure 2:
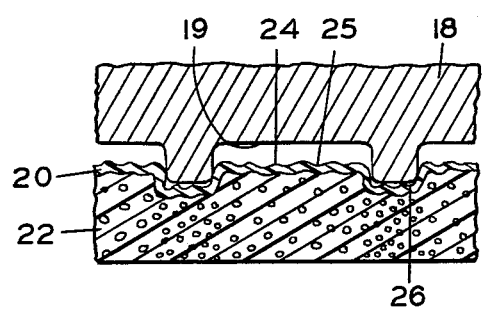

In the above-mentioned patents, the oven 18 shown in FIG. 2 of U.S. Pat. No. 3,741,851, serves to fuse the resin materials and decompose the blowing agent uniformly throughout the area of the product. Thereafter, the web is passed while still hot, for instance while at a temperature of from about 225° F. to about 325° F., to an embossing structure. The invention herein deals with a modification of the structure of U.S. Pat. No. 3,741,851 in the area between the oven 18 and the point where there is the embossing structure of that patent.

The warm web 2, which would move from the oven structure 3, passes around a conventional guider structure 4 which maintains the registry of the printed pattern of the web with the embossing roll pattern in a direction transverse to the direction of the web movement. The guider structure is composed of two guide rolls 6 and 8. The back of the web will pass over roll 6 and then the web face will pass under roll 8, with the roll surface in contact with the surface of the web to be embossed. The surface structure of this roll 8 will be further described below. This roll 8 is usually maintained at a surface temperature of 85° to 125° F. The assembly 4 is a commercially available "Kamberoller" which involves two angled guide rolls on a carriage mounted for transverse movement. The transverse guiding of the sheet is carried out through the use of the "Kamberoller" structure, and this structure is disclosed in U.S. Pat. No. 3,024,955 and 2,797,091. The only difference between the structure disclosed in the patents and that of this application is in the surface configuration of roll 8 herein and that point will be discussed below. The transverse guiding is used so that the transverse guiding or pattern edge of the sheet will be maintained in a certain relative position to the embossing roll pattern farther down the processing line so that there will be registry of the embossing roll pattern with a printed pattern on the web 2 in a transverse direction of the web.

The web then may pass over a roller 10, which may be a back wetting structure such as that set forth in copending Application Ser. No. 554,321, filed Feb. 28, 1975 and entitled "Multilevel Embossing of Foamed-Sheet Materials." Under some circumstances, the cooling feature of roll 10 may be utilized, and in other circumstances, the cooling feature of roll 10 is not needed and, therefore, roll 10 need only be a steel transport roll. Particular condition of roll 10 is not critical to the invention herein. Under some circumstances, a "Teflon"

coated roller 12 may be utilized to provide additional heat to the top surface of the web to compensate for heat loss which may occur as the web is moving through ambient air from the oven 3 towards the embossing structure 14. It is obvious that the roll 12 must not be heated to the point, nor supply sufficient force to the upper surface of the web 2, to alter the embossed surface configuration of web 2 at the point of engagement by roll 12.

An embossing structure 14 composed of a back-up roll 16 and an embossing roll 18 will engage the web to provide deeply embossed relief areas. The web is embossed almost as soon as it comes in contact with the steel back-up roll 16. Under some circumstances, for example, thick foam products, it may be desirable to move the embossing roll 18 to a position underneath of roll 16 (see 18'). Under this set of circumstances, the web will be partially wrapped around the steel back-up roll 16 before the embossing is carried out by the embossing roll 18' in its altered position. When embossing is carried out with the embossing roll 18' underneath of the back-up roll 16, the back-up roll 16 will be cooled by chilled water to a surface temperature of about 75° to 100° F. and will function to further cool the backside of the web and stabilize the foam prior to the time that embossing is carried out. Therefore, the steel back-up roll 16 is functioning both as a cooling drum and as a back-up roll for the embossing roll 18'. The embossing which is carried out at this point will be through the use of a "bottomless" embossing roll. This structure will be very similar to that structure disclosed in U.S. Pat. No. 3,741,851. The embossing roll 18 will contain valleys 19 which are considerably deeper than the total thickness of the embossable surface of the web 2, but are usually 0.100 inches in depth for the most part (see FIG. 2).

The web 2, as will be described below, will be composed of a backing of about 0.0028 of an inch thick. Over this will be placed a foam layer of about 0.035 inches thick. On top of this will be a wear layer of 0.010 inches thick. The total thickness of the material being embossed will be about 0.073 inches, which is substantially less than the above-described valley depths of the embossing roll 18. Consequently, when roll 18 is providing the deep embossing on the upper surface of the web 2, only the raised areas of the embossing roll 18 will engage the web 2. The valley regions 19 of the embossing roll 18 will not contact the upper surface 25 of the web 2.

Since there is a need to register the embossing pattern of roll 18 with a printed pattern on the web 2, there must be control of the embossing roll pattern relative the printed pattern to get registry between the two patterns. This will require registry along the machine direction and this registry along the machine direction, which is in the direction longitudinally of the sheet movement, is maintained in the same manner as set forth in U.S. Pat. No. 3,655,312, Column 5, line 53, to Column 6, line 43. The technique of U.S. Pat. No. 3,694,634 and U.S. Pat. No. 3,741,851 can be adopted herein for machine direction registry also. At this point it should be noted that registration controls, both across the machine direction and along the machine direction, are necessary to secure a commercially acceptable product with registration between the embossed pattern and the printed pattern, but such controls are not a part of the invention herein, since they are conventional in the art.

The essence of the invention herein is in the modification of roll 8 of guider structure 4. The surface of roll 8 is provided with a textured or design carrying configuration. In effect, roll 8 is being used as an embossing roll which will place shallow patterns on the upper surface of the web 2. The pattern placed on roll 8 could be of a certain specific design, or it could simply be an irregular dimpled surface used simply to provide a texturing to the upper surface of the web 2. Roll 8 will have an embossed surface or texturing which will have a difference of 0.015-0.030 inches between the raised areas and valley areas of its embossing configuration. This roll 8 will be fully impressed against the web surface. This roll 8 will be kept at a temperature of 85°-125° F. with the web surface at 275°-325° F. Due to the positioning of rolls 6 and 10 with the web 2 passing thereover, the web 2 will be held tightly in engagement with roll 8 so that roll 8 will be able to provide a textured embossment to the upper surface of the web 2. The depth of embossing typically obtained during this overall embossing step is 0.005-0.007 inches due to spring-back in the material. As the textured web moves to the embossing means 14, the "bottomless" embossing roll structure 18 will not disturb the texturing on the raised areas of the web wherein deep embossing is not carried out.

Referring now to FIG. 2, there is a cross-sectional view of a portion of web 2. The upper surface of the web 2 has a vinyl wear layer 20. This is positioned over a foam layer 22. Roll 8 will provide surface texturing 24 on the total surface of the embossed product and this appears on the raised areas of the embossed product after the "bottomless" embossing roll 18 has produced the deep embossing 26. In addition, the deep embossing 26 will be placed on the web without the embossing roll 18 disturbing the original texturing 24 that roll 8 had previously placed on the web. The texturing 24 will even appear in the valley areas 26 of the final embossed product.

It is possible that the material of U.S. Pat. No. 3,741,851 could come from the oven 18 of that patent and pass through all of the apparatus of that patent with only one slight modification in that apparatus to yield the product of FIG. 2 herein. In the structure of U.S. Pat. No. 3,741,851, a "Kamberoller," a lateral guide structure, would be utilized and the second roll thereof would be provided with texturing as roll 8 herein. In the structure of U.S. Pat. No. 3,741,851, there is the indication that only 25% of the total sheet area can be embossed, whereas, with the structure herein, it is possible to emboss, by the use of both texturing and deep embossing, the full 100% sheet surface area.

Even though this invention can provide for unique embossed designs on wear layers composed of vinyl formulations, as described in U.S. Pat. No. 3,741,851, the embossing of additional non-vinyl wear layers is possible. For example, it is also possible to emboss a cured thermoset wear layer web which has a foam underlayer. This particular product will be made by placing a plastisol on a carrier web such as that disclosed in U.S. Pat. No. 2,759,813. The following plastisol is prepared by thoroughly mixing the following ingredients:

| Ingredients | Parts by Weight |
|---|---|
| Poly(vinyl chloride) | 100 |
| Dioctyl phthalate (plasticizer) | 49.55 |
| Octyl epoxy tallate (stabilizer) | 5.0 |
| Titanium dioxide | 3.6 |
| Azodicarbonamide (blowing agent) | 2.3 |
| Talc | 0.6 |

| -continued | |
|---|---|
| Ingredients | Parts by Weight |
| Zinc octoate (blowing agent activator) | 1.95 |

This above plastisol is applied to the above-described carrier which is a coated bearer-saturated asbestos sheet having a thickness of about 0.028 inches. The plastisol is applied with a reverse roll coater to a wet thickness of 10 mils. The plastisol-coated backing is gelled in a hot air oven for 1 minute to an exit temperature of 270° F.

The sheet is then cooled and a printed design is placed thereon. The printed design may be of any particular pattern and could be of the same pattern shown in FIG. 3 of U.S. Pat. No. 3,741,851. Inks are prepared by thoroughly mixing the following ingredients:

| Ingredients | Parts by Weight |
|---|---|
| Vinyl binder | 33.0 |
| Pigment | 12.8 |
| Cellosolve acetate | 1.6 |
| 2 Nitropropane | 50.0 |
| Isopropyl acetate | 1.0 |
| Alkyl alcohol aryl polyether | 1.0 |

Inks of various colors based on the above formula are applied to the gelled plastisol sheet described above utilizing the printing cylinders of a conventional rotogravure printing press. The printing cylinders are run in a normal manner producing the design that is printed in register. The inks are dried by subjecting the printed sheet to warm air impingement supplied by the enclosed drying zones of the press. The inks are not critical to the invention herein, but simply need be inks which are capable of adhering to and drying on the plastisol above described.

To the printed gelled plastisol above is applied a plastisol layer having the following formula:

| Ingredients | Parts by Weight |
|---|---|
| Poly(vinyl chloride) | 100 |
| Dioctyl phthalate (plasticizer) | 12 |
| 2,2,4-trimethyl-1,3-pentadiol mono-isobutyrate, Nuoplaz 1046, Nuodex ink (non-staining plasticizer) | 27 |
| Barium-cadmium-zinc phosphite (stabilizer) | 3 |
| 2,2,4-trimethyl-1,3-pentadiol di-isobutyrate | 5 |
| Optical brightener | 0.005 |

The above plastisol was applied to the printed sheet as a wet film with a thickness of 8.5 mils. It is fused by being heated at 325° F. in a hot-air impingement oven for 2 minutes. This heating step will result in partial blowing of the azodicarbonamide blowing agent in the gelled first coat.

To this last applied fused plastisol there is applied a clear 2 mil (dry) coating of a curable polyurethane. The polyurethane coating is a 55:45 xylene/resin solution containing catalysts. Heat is applied and the polyurethane coating is cured in 3 minutes' time. The heat applied will complete the decomposition of the blowing agent in the gelled first coat to convert it to a foam layer of 0.032 inches thickness, and, will also cure the polyurethane coating. Heat is applied by passing the web through a three-stage oven which has the first stage heated to 270° F., second stage heated to 380° F., and third stage heated to 340° F. The last coating applied is the wear layer surface of the resulting floor product which will be formed. Polyurethane coatings are applied to secure a product which will retain a hard, high gloss surface, and eliminate the need for subsequent waxing by the user of the floor. Again, criticality does not particularly rest in the wear layer coating. It is necessary that the coating be embossable when heated to a range of about 225° to 350° F. The invention is particularly applicable to a structure which constitutes a wear layer having thereunder a foam layer, and, it is desirable to emboss the wear layer without damaging the stability of the printed foam sheet during embossing in registry with the printed pattern.

Because a polyurethane wear surface will tend to lose heat a lot faster than a conventional vinyl wear surface, the roll 12 clearly would be used to engage the upper surface of the web, the polyurethane wear surface. Roll 12 would be heated to 200° to 250° F. to help maintain the temperature of the polyurethane wear surface to at least this level. This would not in any way distort the texturing or embossing that had been placed on the wear layer surface by the roll 8. The web will then pass to the back-up roll 16 and the embossing roll 18 and be deeply embossed. The embossing roll would be maintained at about 75° F. surface temperature and the back-up roll would also be maintained at about 75° to 100° F. surface temperature. The product, as it passes between the nip of the embossing roll, which is the area between roll 18 and roll 16, will have the polyurethane wear layer, or the top surface of web 2 at a temperature of about 225°–300° F. The cold embossing rolls will immediately freeze the desired embossed pattern into the polyurethane wear layer at the time the embossing is carried out. The thickness of the web described above will be about 70 mils. The embossing pattern provided by embossing roll 18 will comprise approximately 25% of the total roll surface and the depth of the pattern on the roll 18 will be such that the valley areas 19 of the embossing pattern will not engage the areas 25 of the web surface. Due to spring-back in the material, the end product has a major embossed depth 26 of about 15 mils and a minor textured depth 24 of 5–7 mils. The foam layer in the valley embossed areas 26 will be somewhat depressed as compared to the foam in the areas 24 not deeply embossed.

It has been found that with conventional poly(vinyl chloride) wear layers and foams, such as those disclosed in U.S. Pat. No. 3,741,851, it may be desirable to move the web partially around the back-up roll 16 and position the embossing roll 18' at the bottom of the back-up roll 16. Under this set of circumstances at the time of embossing, the wear layer will be at about 250° F., while the backside of the foam adjacent the carrier backing will be at about 125° to 150° F. The wrapping of the web around the cooled back-up roll 16 will provide this reduction in the temperature of the back of the web as well as prevent slippage of the sheet during machine direction registration of the embossing roll to the printed pattern. As was previously indicated, it is also possible that roll 10 could provide some back wetting. It is also equally true that all cooling and back wetting could be eliminated and the sheet could be embossed satisfactorily in the manner disclosed in U.S. Pat. No. 3,741,851, without back wetting, as long as only about 25% of the sheet is deeply embossed. Additional surface embossing must be secured through use of roll 8 of guider 4.

What is claimed is:

1. Apparatus for embossing a web of material having a foamed resin layer with an overlying top layer of substantially impervious resin material, said web having a printed design thereon, the apparatus comprising:
   (a) a first embossing roll means engaging the impervious resin material to provide a surface texturing thereto to the whole surface of the web,
   (b) a second embossing means comprising a pair of rollers cooperating to provide an embossing nip, at least one of the rollers having embossing lands projecting at the periphery of the roller to compress the top layer and foamed resin only in the areas to be formed as valleys in said top layer and foamed resin, the recessed areas in said embossing roller between said lands being of sufficient depth to provide for said compression of the top layer and foamed resin in the valleys without contacting the remaining area of the pattern being produced on the product, said second embossing means embossing in part over areas which were embossed by said first embossing means, and
   (c) means controlling the registry of the second embossing means with the printed design so that the embossing lands of the second embossing means is in registry with portions of the printed design.

* * * * *